United States Patent [19]

Chadwick

[11] Patent Number: 4,700,854
[45] Date of Patent: Oct. 20, 1987

[54] OPEN TOP DRAW BAR ARRANGEMENT HAVING REMOVABLE WEDGE

[75] Inventor: Dennis Chadwick, Amherstview, Canada

[73] Assignee: Urban Transportation Development Corporation, Ltd., Toronto, Canada

[21] Appl. No.: 753,953

[22] Filed: Jul. 11, 1985

[30] Foreign Application Priority Data

Jun. 7, 1985 [CA] Canada ................................ 483390

[51] Int. Cl.⁴ ............................................. B61G 9/22
[52] U.S. Cl. ................................. 213/62 R; 213/184; 213/50; 213/64
[58] Field of Search ..................... 213/50, 62 R, 62 A, 213/64, 96, 97, 182, 184

[56] References Cited

U.S. PATENT DOCUMENTS

| | | | |
|---|---|---|---|
| 110,088 | 12/1870 | Street | 213/182 |
| 308,011 | 11/1874 | Thomas | 213/182 |
| 478,492 | 7/1892 | Woolf | 213/182 |
| 615,803 | 12/1898 | Cadwell | 213/96 |
| 1,925,319 | 9/1933 | Goodall | 213/62 A |
| 2,282,146 | 5/1942 | Mealing et al. | 213/62 A |
| 2,327,240 | 8/1943 | Barrows et al. | 213/62 A |

OTHER PUBLICATIONS

"Intermodal Car Equipment", published by CP Rail, Mechanical Department, Sep. 15, 1982.

Primary Examiner—Randolph A. Reese
Assistant Examiner—Scott H. Werny
Attorney, Agent, or Firm—Spencer & Frank

[57] ABSTRACT

A slackless draw bar coupler arrangement in which the car has a draw bar pocket with an open top, a slotted draft plate and a buff plate and the draw bar has a bar body with a spherical head connected to the body by a neck. Located about the neck is a thrust ring for disposition between the draft plate and the head and at that side of the head remote from the neck, there is a thrust disc insert for disposition between the buff plate and the head. The thrust disc insert and thrust ring are carried in holders. Between the buff plate and the thrust disc insert is a removable wedge which is spring loaded to urge the thrust disc insert firmly towards the head of the draw bar.

13 Claims, 3 Drawing Figures

OPEN TOP DRAW BAR ARRANGEMENT HAVING REMOVABLE WEDGE

This invention is concerned with a draw bar arrangement by which the cars of a train are coupled. More particularly, the invention is concerned with a slackless draw bar arrangement of which the draw bar is quickly replaceable and which is self adjusting for wear and tolerances.

According to one aspect of this invention, there is provided a draw bar for use with a car having an open top draw bar pocket including a slotted draft plate and a buff plate, the draw bar comprising a tubular body, a spheral head connected to the body by a neck and a thrust ring disposed about said neck, said neck being dimensioned to pass through the slotted draft plate of the car with the thrust ring disposed between the ball and the draft plate.

Preferably, the thrust ring is connected to a thrust insert disposed at the distal side of the head and located between the head and the buff plate.

According to another aspect of the present invention, there is provided the combination of a car having an open top draw bar pocket including a slotted draft plate and a buff plate and a draw bar for engagement with the pocket, the draw bar including a bar body with a spherical head connected to the body by a neck for engagement in the slotted draft plate. Preferably, a thrust ring is disposed about the neck for disposition between the head and the draft plate of the pocket. It is also preferred to provide a thrust insert for disposition between the head and the buff plate. Most desirably, there is provided a wedge for disposition between the thrust insert and the buff plate urging the insert into engagement with the head of the draw bar. This wedge is preferably spring loaded.

The thrust ring and thrust insert may be joined together to be removed as a unit with the draw bar from the draw bar pocket.

The preferred embodiment of the invention is illustrated in the accompanying drawings in which.

Figure 1:
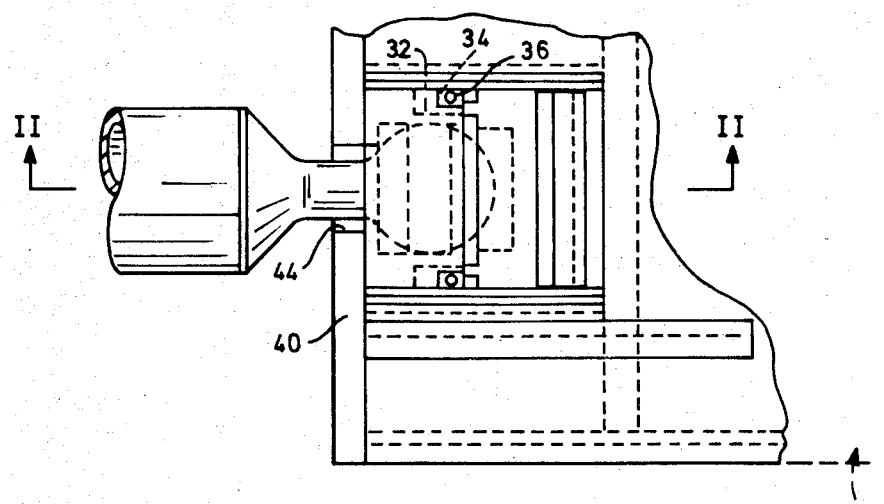
FIG. 1 is a plan view of a draw bar assembly according to the present invention.

The arrangement illustrated in the drawings comprises a draw bar 10 and a draw bar pocket indicated generally at 12. The draw bar comprises a tubular draw bar body 14 to which a cast or forged spherical head 16 is secured through an elongated neck 18 and a generally conical shoulder structure 20, the shoulder structure 20 being recieved within the end of the tubular body 14 and welded in place as at 22.

Loosely disposed about the neck 18 is a cast thrust ring holder 24 which is split about a central vertical plane for assembly to the draw bar, the two parts being joined by bolts. Received within the ring holder 24 is a split bronze thrust ring 26 against which the head 16 bears. The exterior surfaces of the ring holder are shaped to fit snugly within the draw bar pocket of the car (11).

A thrust insert holder 28 is disposed at the distal side of the head, i.e. the side of the head remote from the neck. A disc-shaped thrust insert 30 is fitted into a recess on that surface of the insert holder 28 which faces the head 16 of the draw bar, the insert 30 having a concave, part spherical surface for engagement with head 16.

Centrally in the side surfaces of the ring holder 24 are a pair of recesses 32 (see FIG. 1) and hooked projections 34 at the leading edges of the insert holder 28 extend into recesses 32 where they are held captive by retainer pins 36 supported in the ring holder 24. In this way, the insert holder is longitudinally displaceable relative to the ring holder but is removable with the draw bar and ring holder as a unit from the draw bar pocket.

The draw bar pocket is generally box shaped and comprises a draft plate 40 welded to the ends of the sill 42 of the car, the draft plate having a slot 44 through which the neck of the draw bar may pass but through which the head and ring and insert holders may not pass. A buff plate 46 is welded and gusseted across the sill. Side plates 48 of the sill structure complete the open topped draw bar pocket.

Parallel to the sides of the draw bar pocket and welded into position on the sill structure are a pair of L sectioned guide ways 50 which guide a sliding closure plate 52 which serves to hold the assembly of draw bar and insert holders within the draw bar pocket and permit its removal.

Figure 2:
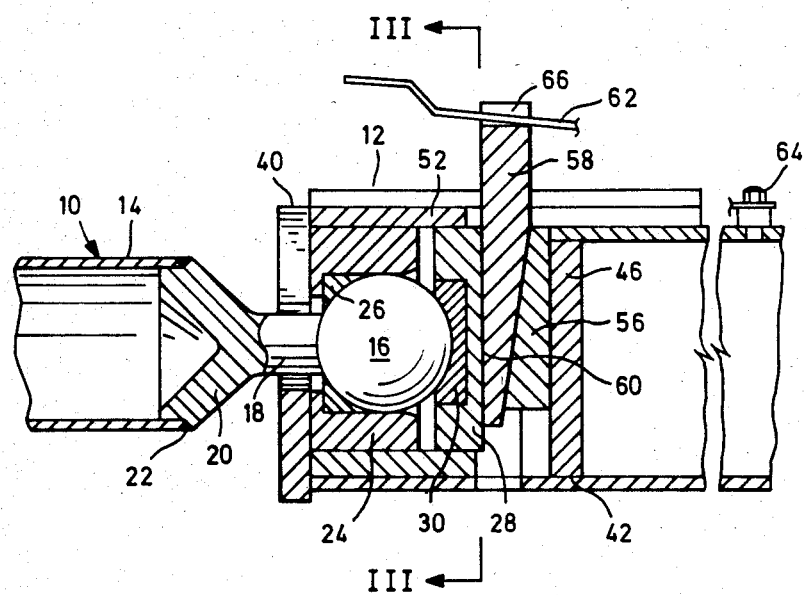
FIG. 2 is a cross section II of FIG. 1.
Figure 3:
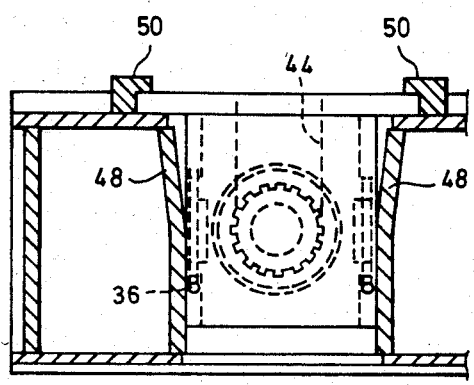
FIG. 3 is a cross section on the line III of FIG. 2.

A wedge shaped reaction plate 56 is secured to the buff plate 46 and co-operates with a wedge 58 which engages between the reaction plate 56 and a reaction surface 60 of the insert holder 28. A leaf spring 62 is pivoted at 64 and engages in a groove 66 in the upper edge of wedge 58 to urge the wedge downwardly, as viewed in FIG. 2, to press the insert holder 28 against the ball 16.

In assembling the draw bar to the car, the leaf spring 62 is lifted from the groove 66 of wedge 58 and rotated about pivot 64. Thereafter, the draw bar assembly is lowered into position within the draw bar pocket. Because the wedge is not in place at this stage, this is a very easy fit and does not require delicate maneuvering of the cars which the draw bar connects. When the draw bar head is disposed within the pocket, the plate 52 is slid to the position shown in FIG. 2 and the wedge is then inserted and spring 62 repositioned.

When draft forces are exerted on the thrust ring holder 24, the wedge, under its own weight and under the urging of spring 62 will move to press the insert holder firmly into engagement with the ball, thus eliminating slack.

To eliminate rotation of the draw bar about longitudinal axis, one may insert a pin through the thrust ring holder 24 to engage within head 16. Alternatively, an out rigger can be formed on the draw bar tube to engage a bracket on the sill or other chassis element of the car.

It will be appreciated that the draw bar according to the present invention provides for very simple assembly and automatically adjusts both the wear and for tolerances to avoid slack and, of course, the impact loading associated with slack.

I claim:

1. A draw bar for use with a car having a draw bar pocket including an open top, and a slotted draft plate and a buff plate, the draw bar comprising a bar body, a spherical head connected to said body by a neck and a thrust ring disposed about said neck, said neck being dimensioned to pass through the slotted draft plate of the draw bar pocket with the thrust ring disposed between the head and the draft plate, a thrust insert disposed at the distal side of the head for positioning, in use, between the head and the buff plate of the draw bar pocket, and displaceable longitudinally relative to said thrust ring and biasing means to bias continuously said insert toward said ring to eliminate play between said head and said ring and insert, said biasing means including wedge means disposed in and being removable from said draw bar pocket through said open top, while maintaining engagement of said draw bar with said draw bar pocket.

2. A draw bar as claimed in claim 1 wherein said thrust ring is disposed in a holder shaped to fit snugly within a draw bar pocket.

3. A draw bar as claimed in claim 2 wherein said thrust insert is disposed within a holder.

4. A drawbar as claimed in claim 3 wherein said wedge means acts between said draw bar pocket and one of said holders.

5. A draw bar as claimed in claim 4 wherein said biasing means includes a spring to urge said wedge means in a direction to move said holders towards one another.

6. A draw bar according to claim 4 wherein said wedge means includes a wedge member bodily moveable relative to said pocket to bias said holders toward one another.

7. A draw bar as claimed in claim 5 wherein said wedge means acts between said buff plate and said insert holder.

8. In combination, a car having a draw bar pocket including an open top, and a slotted draft plate and a buff plate and a draw bar for engagement with the pocket, the draw bar including a bar body with a spherical head connected to the body by a neck for engagement in the slotted draft plate, a thrust ring disposed about the draw bar neck and between the head and the draft plate of the pocket, a thrust insert disposed between the head and the buff plate and longitudinally displaceable relative to said thrust ring and biasing means to bias continuously said insert toward said ring to eliminate play between said head and said ring and insert, said biasing means including wedge means disposed in and being removable from said draw bar pocket through said open top, while maintaining engagement of said draw bar with said draft bar pocket.

9. A combination as claimed in claim 8 wherein said thrust ring and thrust insert are disposed in respective holders and said wedge means are provided between said insert holder and the buff plate.

10. A combination as claimed in claim 9 wherein said wedge means is spring loaded in a direction to urge said insert holder towards said head.

11. A combination according to claim 10 wherein said wedge means includes a wedge member slidable relative to said pocket along a vertical axis and said spring loading urges said wedge member vertically downward and into said pocket.

12. A draw bar for use with a car having an open topped draw bar pocket including a slotted draft plate and a buff plate, the draw bar comprising a bar body, a spherical head connected to said body by a neck and a thrust ring disposed about said neck, said thrust ring being disposed in a holder shaped to fit snugly within said draw bar pocket, said neck being dimensioned to pass through the slotted draft plate of the draw bar pocket with the thrust ring being disposed between the head and the draft plate, a thrust insert disposed with a holder and at the distal side of the head for positioning, in use, between the head and the buff plate of the draw bar pocket, and displaceable longitudinally relative to said thrust ring, and biasing means including wedge means acting between said draw bar pocket and said insert, to bias continuously said insert toward said ring to eliminate play between said head and said ring and insert, said biasing means being removable from said draw bar pocket while maintaining engagement of said draw bar therewith, said biasing means further including a leaf spring to urge said wedge members in a direction to move said holders towards one another, said leaf spring being pivotable relative to said pocket to move said spring out of engagement with said wedge means.

13. A draw bar as claimed in claim 12 wherein said wedge means includes a wedge member disposed for movement into said pocket along a vertical axis, downward vertical movement of said wedge member moving said thrust insert toward said thrust ring.

* * * * *